US010388140B2

(12) United States Patent
Tappan

(10) Patent No.: US 10,388,140 B2
(45) Date of Patent: Aug. 20, 2019

(54) AUTOMATED ALARM SHELVING

(71) Applicant: Bently Nevada, LLC, Minden, NV (US)

(72) Inventor: Jacqueline Marie Tappan, Minden, NV (US)

(73) Assignee: Bently Nevada, LLC, Minden, NV (US)

( * ) Notice: Subject to any disclaimer, the term of this patent is extended or adjusted under 35 U.S.C. 154(b) by 10 days.

(21) Appl. No.: 15/787,624

(22) Filed: Oct. 18, 2017

(65) Prior Publication Data

US 2019/0114897 A1 Apr. 18, 2019

(51) Int. Cl.
*G08B 21/18* (2006.01)

(52) U.S. Cl.
CPC .................................... *G08B 21/18* (2013.01)

(58) Field of Classification Search
CPC ......... H04L 41/06; H04L 41/0604–065; G06F 11/3058; G06F 11/3065–3086; G05B 23/0272
See application file for complete search history.

(56) References Cited

U.S. PATENT DOCUMENTS 5,764,913 A * 6/1998 Jancke .................. G06F 11/328 709/224
8,264,339 B2 9/2012 Okada
9,311,810 B2 4/2016 Downor
9,633,552 B2 4/2017 Janchookiat
2005/0228509 A1* 10/2005 James ................. H04L 12/4625 700/19
2008/0208373 A1* 8/2008 Thurau ................ G05B 23/027 700/80
2012/0084031 A1* 4/2012 Saito .................. G05B 19/4184 702/62
2013/0002697 A1* 1/2013 Ashley .................. G06T 11/206 345/589
2015/0205268 A1* 7/2015 Downor ................. G08B 21/18 340/517
2016/0300475 A1 10/2016 Childs et al.
2017/0003200 A1 1/2017 McDowell et al.
2018/0109955 A1* 4/2018 Nixon .................... G05B 15/02

OTHER PUBLICATIONS

Economic and Effective Alarm Management, Rockwell Automation, pp. 1-14, Jun. 2017.
Alarm Status—Shelving, Igntion User Manual 7.8, pp. 1-5, Sep. 26, 2017.

* cited by examiner

*Primary Examiner* — Laura N Nguyen
(74) *Attorney, Agent, or Firm* — Mintz Levin Cohn Ferris Glovsky and Popeo, P.C.

(57) ABSTRACT

Method and systems are provided for automated alarm shelving. In one embodiment, the method can include receiving data characterizing a state-transition of a machine from a first operational state to a second operational state. The method can also include setting a first field of a first data structure representing a first alarm of the first operational state to a shelved value representative of suppression of the first alarm. The method can further include setting a second field of a second data structure representing a second alarm of the second operational state to an activity value determined based on the received data characterizing the transition and a previous alarm associated with the second operational state.

14 Claims, 8 Drawing Sheets

AUTOMATED ALARM SHELVING

BACKGROUND

It can be difficult to manually monitor complex machines that have several moving and/or vibrating parts (e.g., turbines, compressors, and the like). Monitoring systems can be commonly used to monitor the operation of complex machines, and generate alarms when the machine is not operating as desired. Monitoring systems can include sensors to detect operational information (e.g., operating parameters, operational states, and the like) associated with the machines, and relay a signal to a computing device, which can visually present the operational information for a designated personnel. For example, a turbine can include an accelerometer that can monitor the motion of blades of a turbine and relay angular velocity measurements to a computer for visualization.

Operational information of a complex machine can include information related to multiple operational parameters and multiple operational states of the machine. For example, Operational states can include a state in which the machine is starting up or shutting down ("startup-shutdown state"), state of normal operation ("running state"), state in which the machine is turned off ("machine off state"), and the like. The operating parameters of the various operational states can include, turbine angular velocity, machine-part vibration rate, and the like. The computing device can automatically generate alarms to identify undesirable behavior of the machine, which can transition through multiple operational states. These alarms can be generated based on alarm triggers or set points, which can include conditions that can be uniquely configured for the different operational states of a machine. Graphical representation of generated alarms along with operational information of the machine in a graphical display can be valuable for understanding trends in machine operation. However, as the machine transitions through multiple operational states, multiple alarms can be generated for each state. As a result, the graphical display can become cluttered and deciphering operation trends can become challenging.

SUMMARY

In general, apparatus, systems, methods and article of manufacture for automated alarm shelving are provided.

In one embodiment, a method of automated alarm shelving is provided. The method can include receiving data characterizing a state-transition of a machine from a first operational state to a second operational state. The method can also include setting a first field of a first data structure representing a first alarm of the first operational state to a shelved value representative of suppression of the first alarm. The method can further include setting a second field of a second data structure representing a second alarm of the second operational state to an activity value determined based on the received data characterizing the transition and a previous alarm associated with the second operational state.

One or more of the following features can be included in any feasible combination.

In one embodiment, the data characterizing the state-transition of the machine can include operational parameter values of the machine in the first operational state and second operational state, and timing information associated with the first operational and second operational state. In another embodiment, determining the activity value can include retrieving information related to the previous alarm associated with the second operational state, and evaluating the activity value based on received operating parameter values of the second operational state.

In one embodiment, the method can include displaying a first graphical object representing the first alarm in a graphical display space including a first axis representative of the time information. The graphical display space can include a second axis for displaying a plot over time of the operational parameter values of the machine. An extent of the first graphical object can be limited to time values of the time information associated with the first operational state.

In other embodiments, the method can include setting a third field of a third data structure representing a third alarm of the first operational state to a shelved value representative of suppression of the third alarm. In another embodiment, data characterizing the first operational state can be presented in a first row of a table having a first visual characteristic and data characterizing the second operational state can be presented in a second row of the table having a second visual characteristic. The first visual characteristic can be different from the second visual characteristic.

In one embodiment, the first operation state and the second operational state can be one of a startup-shutdown state, a running state, and a machine-off state. In another embodiment, the method can include receiving an input indicative of acknowledgment of the first alarm. The method can also include setting the first field of the first data structure to a cleared value representative of suspension of the first alarm.

In other aspects, the method can include displaying a hierarchical structure in a graphical display space. The hierarchical structure can include a first hierarchical level visually presented by a first icon and a second hierarchical level visually presented by a second icon. The first hierarchical level can be representative of a machine unit that includes the machine, and the second hierarchical level can be representative of the machine. The state transition of the machine can be represented by altering the visual characteristic of the first icon and the second icon.

In another embodiment, a non-transitory computer program product is provided for storing instructions that can be executed by at least one data processor of at least one computing system. When executed the instructions can implement a method that can include receiving data characterizing a state-transition of a machine from a first operational state to a second operational state. The method can also include setting a first field of a first data structure representing a first alarm of the first operational state to a shelved value representative of suppression of the first alarm. The method can further include setting a second field of a second data structure representing a second alarm of the second operational state to an activity value determined based on the received data characterizing the transition and a previous alarm associated with the second operational state.

One or more of the following features can be included in any feasible combination.

In one embodiment of the non-transitory computer program product, the data characterizing the state-transition of the machine can include operational parameter values of the machine in the first operational state and second operational state, and timing information associated with the first operational and second operational state. In another embodiment, determining the activity value can include retrieving information related to the previous alarm associated with the second operational state, and evaluating the activity value based on received operating parameter values of the second operational state.

In other aspects of the non-transitory computer program product, the method can include displaying a first graphical object representing the first alarm in a graphical display space including a first axis representative of the time information. The graphical display space can include a second axis for displaying a plot over time of the operational parameter values of the machine. An extent of the first graphical object can be limited to time values of the time information associated with the first operational state.

In another embodiment of the non-transitory computer program product, data characterizing the first operational state can be presented in a first row of a table having a first visual characteristic and data characterizing the second operational state can be presented in a second row of the table having a second visual characteristic. The first visual characteristic can be different from the second visual characteristic.

In one embodiment of the non-transitory computer program product, the method can include displaying a hierarchical structure in a graphical display space. The hierarchical structure can include a first hierarchical level visually presented by a first icon and a second hierarchical level visually presented by a second icon. The first hierarchical level can be representative of a machine unit that includes the machine, and the second hierarchical level can be representative of the machine. The state transition of the machine can be represented by altering the visual characteristic of the first icon and the second icon.

In yet another embodiment, a system is provided having at least one data processor and memory storing instructions which, when executed by the at least one data processor, can cause the at least one data processor to perform operations that can include receiving data characterizing a state-transition of a machine from a first operational state to a second operational state. The method can also include setting a first field of a first data structure representing a first alarm of the first operational state to a shelved value representative of suppression of the first alarm. The method can further include setting a second field of a second data structure representing a second alarm of the second operational state to an activity value determined based on the received data characterizing the transition and a previous alarm associated with the second operational state.

One or more of the following features can be included in any feasible combination.

In one embodiment of the system, the data characterizing the state-transition of the machine can include operational parameter values of the machine in the first operational state and second operational state, and timing information associated with the first operational and second operational state. In another embodiment, determining the activity value can include retrieving information related to the previous alarm associated with the second operational state, and evaluating the activity value based on received operating parameter values of the second operational state.

In another embodiment of the system, the method can include displaying a first graphical object representing the first alarm in a graphical display space including a first axis representative of the time information. The graphical display space can include a second axis for displaying a plot over time of the operational parameter values of the machine. An extent of the first graphical object can be limited to time values of the time information associated with the first operational state.

In another embodiment of the system, data characterizing the first operational state can be presented in a first row of a table having a first visual characteristic and data characterizing the second operational state can be presented in a second row of the table having a second visual characteristic. The first visual characteristic can be different from the second visual characteristic.

Various aspects of the disclosed subject matter may provide one or more of the following capabilities. The alarm shelving system can improve the workflow of machine operators monitoring the operation of a machine. For example, automatic shelving of past alarms and presenting them as visually distinct compared to current alarms can allow the machine operator to efficiently attend to the current alarms. Additionally, shelving an alarm of an operational state can be helpful diagnosing problems with the machine when it reenters the operational state in the future.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon It can be desirable to monitor the operation of a machine (e.g., by a network of sensors) and to notify a user of an undesired behavior in operation of the machine. This can be done, for example, by triggering an alarm when an undesired behavior of the machine is detected. A complex machine can have many operational states, and many operational parameters within the operational state that can be monitored. This can result in the triggering of multiple alarms that can be associated with both the current and the past operational states of the machine. However, alarms associated with past operational states may not be immediately relevant and can distract the user. By automatically suppressing (e.g., "shelving") alarms of a prior operational state as the machine transitions from the prior operational state to a current operational state, the user can focus their attention to the current operational state without the distraction of past alarms. Furthermore, when the machine reenters an operational state associated with a shelved alarm, the shelved alarm can be automatically activated (e.g., unshelved). This can allow the user to efficiently and effectively resolve problems of the machine in the new operational state. Other embodiments are within the scope of the disclosure.

Figure 1:
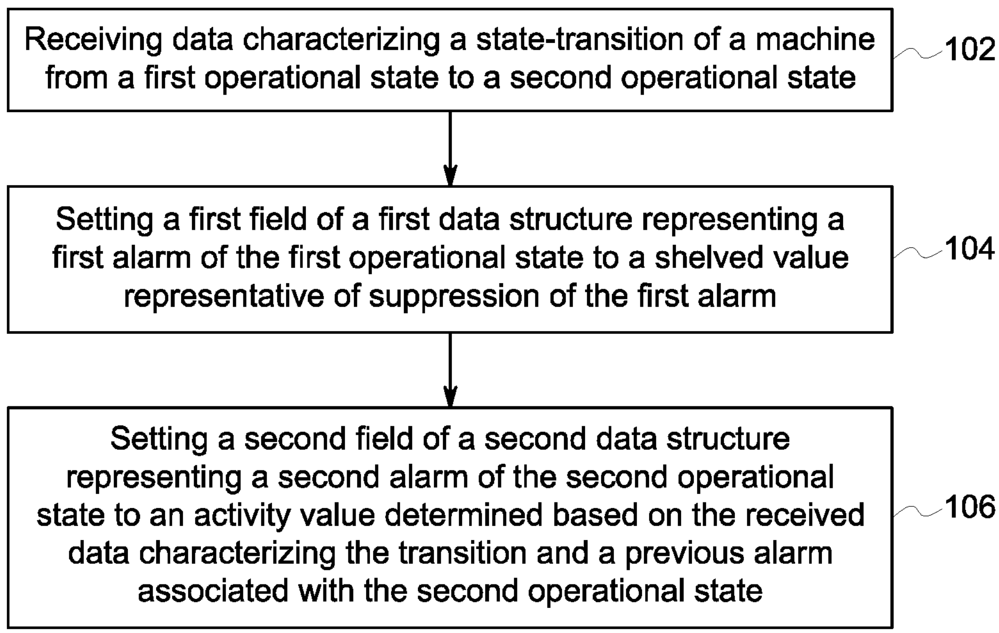
FIG. 1 is a flowchart illustrating an exemplary method of operating an alarm shelving system.

FIG. 1 illustrates an exemplary method of operating an alarm shelving system. At 102, data characterizing a state-transition of a machine from a first operational state to a second operational state can be received. The operational information can include an operational state of the machine; operational parameters associated with the operational state; timing information associated with the operational parameters (e.g., time of measurement of the operational parameters); time stamps of entry into and exit out of the operation state; information related to transition of the machine through various operational states; and the like.

Figure 2:
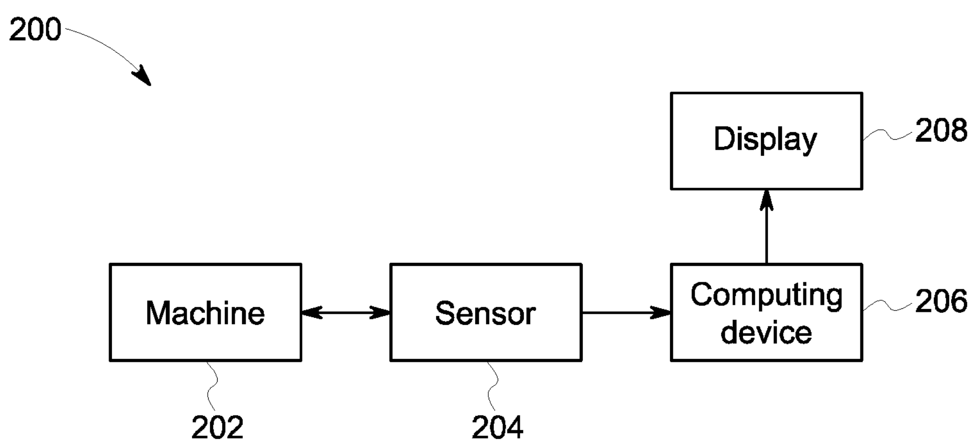
FIG. 2 is a schematic representation illustrating an exemplary embodiment of an alarm shelving system.

In some implementations, the data can be received by a computing device. FIG. 2 is a system block diagram illustrating an exemplary system 200 capable of automatically shelving and unshelving alarms. The system 200 can include a machine 202 (e.g., turbine, motor, and the like), a sensor 204 (e.g., accelerometer, position sensor, and the like), a computing device 206 (e.g., laptop, mobile phone, and the like), and a display 208. The sensor 204 can detect operational information of the machine 202 and can relay the detected information to the computing device 206. The computing device 206 can receive and save this information, and can visually present the information on a graphical display space of the display 208.

The computing device 206 can also generate/select alarms, and can graphically present the alarms on the graphical display space. An alarm can indicate various attributes (e.g., vibration rate of the machine) associated with the operation of a machine. For example, alarms can provide benchmarks (e.g., maximum/minimum threshold values) that can be used to detect anomalous behavior in the operational parameters of the machine 202. Because the operation of a machine can vary based on the operational state of the machine, the benchmarks for detection of anomalous behavior can change with the operational state. For example, a machine can have higher vibration when it is turned on (e.g., "startup state") compared to when its operations have stabilized after it has been running for a while (e.g., "running state"). Therefore, an acceptable vibration threshold for the startup state can be higher than an acceptable vibration threshold for the running state. Hence, alarms can be operational state dependent.

An alarm can include several alarm properties such as, an operational state identifier, alarm activity, alarm level, alarm type, and alarm source. An operational state identifier property can indicate a predetermined identifier to which the alarm has been assigned. When the machine is in a given operational state, the computing device 206 can select an alarm from a set of alarms designated to the given operational state. Alarms for one operational state of a machine may not be useful in monitoring the machine in a second operational state. As the machine transitions from a first operational state to a second operational state, the alarms associated with the first operational state can be suppressed (also referred to as "shelved"). Suppressing an alarm for an operational state can involve altering the manner in which the alarm is presented in the graphical display space, changing an alarm activity value associated with the alarm, and the like. If the machine re-enters the operational state associated with a suppressed alarm at a later time, the suppressed alarm can be activated. Activation of a shelved alarm can involve, for example, reversing the changes made to the visual presentation and activity value of the alarm during shelving.

Alarm activity can be indicative of the current state of the alarm. For example, if an alarm has exited the alarm condition, the alarm activity can be set to a predetermined value (e.g., "cleared") indicating that the alarm is no longer active. If an alarm has not cleared and the machine is in the operational state associated with the alarm, the alarm activity value can be set to a second predetermined value (e.g., "active"). If an alarm has not cleared and the machine is not in the operational state associated with the alarm, the alarm activity value can be set to a third predetermined value (e.g., "shelved"), which can indicate that the alarm has been suppressed. When the machine reenters the operational state for which a suppressed alarm exists, the suppressed alarm can be activated and its alarm activity value can be set to "active." Alternately, if it is determined, upon reentering the operational state that the shelved alarm is no longer needed (e.g., if the operating parameters do not fall in the range that would trigger the suppressed alarm), the alarm can be exited. As will be discussed with reference to FIGS. 4-9, alarms with different alarm activity values can be presented in a visually distinct manner, which can allow the user to attend to the alarms in a desirable manner (e.g., most urgent alarms first followed by less urgent alarms).

In other aspects, an alarm source can be related to the capabilities of the alarm. If the alarm can be configured to monitor the operation of a machine (e.g., machine 220 which is monitored by the system 200), it can be referred to as having a "condition monitoring" alarm source. The alarm activity for alarms with a condition monitoring alarm source can be set as described above (e.g., set to "cleared," "shelved," "active," and the like). On the other hand, alarms that have been configured to shut-down the machine rather than warn/notify a user can be referred to as having a "protection" alarm source. As these alarms are more critical, they can remain active as long as they continue to exceed configured operating parameters, regardless of current operational state (e.g., set to "cleared", or "active").

Another property of an alarm can be an alarm type that can be related to the manner in which the alarm can be triggered. For example, if an alarm event occurs when one or more values of the operational parameter exceeds the alarm threshold, the alarm can be characterized by an "over" alarm type. If an alarm event occurs when one or more values of the operational parameter is less than the alarm threshold, the alarm can be characterized by an "under" alarm type. If an alarm event occurs when one or more values of the operational parameter falls in a range of alarm threshold values, the alarm can be characterized by an "out of band" alarm type.

Figure 3:
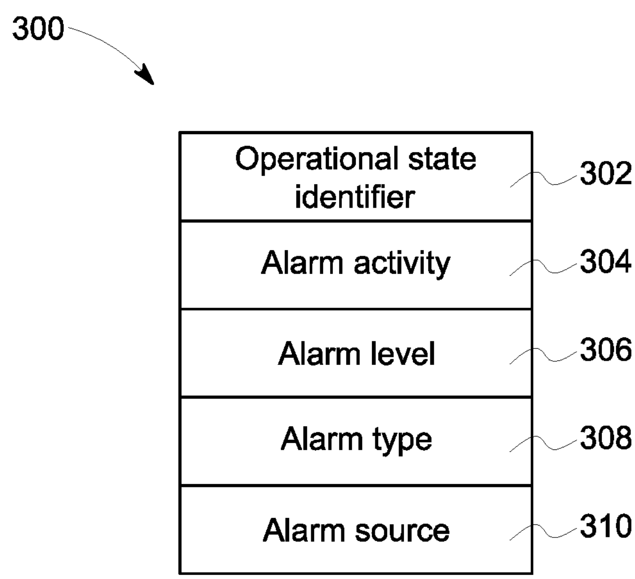
FIG. 3 is a schematic representation illustrating an exemplary alarm data structure.

After receiving the data characterizing one or more operational states of the machine (e.g., at step 102), the computing device 206 can assign alarms based on, for example, operational parameter values of the machine. This can be done, for example, by assigning an alarm data structure to an operational state whose data has been received. The alarm data structure can have multiple fields indicative of various alarm properties (e.g., operational state identifier, alarm activity, alarm level, alarm type, alarm source, and the like). FIG. 3 illustrates an exemplary alarm data structure 300. The alarm data structure 300 can include, for example, fields for operational state identifier 302, alarm activity 304, alarm level 306, alarm type 308, and alarm source 310. Values of one or more of the fields can be set based on the operation of the machine (e.g., transition from one operational state to another). The operational state identifier field 302 can be indicative of the operational state (e.g., machine-off state, startup-shutdown (SUSD) state, running state, and the like) associated with the alarm data structure. The alarm activity field 304 can indicate the current state of the alarm (e.g., cleared, active, shelved, and the like).

Returning back to FIG. 1, in step 104, a first field of a first data structure representing a first alarm of the first operational state can be set to a shelved value representative of suppression of the first alarm. For example, a first field (e.g., alarm activity field 304) can be changed as the machine exits a first operational state (e.g., running state) associated with the first data structure (e.g., alarm data structure 300). Determination of change of an operational state (e.g., exiting the first operational state) can be determined based on data characterizing one or more operational states of the machine. As the machine exits the first operational state, the first field can be set to a predetermined value (e.g., "shelved"). This is referred to as suppression of the alarm associated with the alarm data structure 300. Assigning a predetermined value to the alarm activity field can allow the computing device 206 to retrieve the alarm data structure 300 at a later time (e.g., when the machine reenters the operational state associated with the suppressed alarm). This can be done, for example, by performing a search in an alarm database where the suppressed alarm data structures are stored.

At Step 106 of FIG. 1, a second field of a second data structure representing a second alarm of the second operational state can be set to an activity value determined based on the received data characterizing the transition, and a previous alarm associated with the second operational state. The computing device 206 can search the alarm database for suppressed alarm data structures associated with the new operational state. If a suppressed alarm data structure is detected, it can be retrieved and its alarm activity field can be changed from the predetermined value representative of alarm suppression (e.g., "shelved") to a second predetermined value representative of the activation of the alarm (e.g., "active"). Alternately, upon the machine's re-entry into the new operational state, if the operational parameter values of the new operational state do not merit the alarm, the retrieved alarm can be exited (e.g., "cleared").

A user can indicate to the computing device 206 that the alarm has been acknowledged (e.g., by providing a user input such as by a mouse click). The computing device 206 can keep track of the alarms that are unacknowledged (e.g., alarms with alarm activity field set to "shelved" or "active"). Additionally, if an alarm has been exited without acknowledgement (e.g. when the operational parameters do not merit the alarm), it can also be considered unacknowledged.

An alarm level field 306 can be indicative of the severity of the alarm. The degree of severity can be indicated, for example, by a number. For example, an alarm with higher severity can be assigned a higher numerical value compared to an alarm with lower severity. Alarms of varying severity can be presented using different colors. Several alarms having different alarm levels can be assigned to an operational state. In some implementations, if a machine exits out of an operational state that has multiple alarms with different alarm levels, only the alarm with the highest severity is suspended (e.g., "shelved"). In other implementations, all the alarms associated with the operational state are suspended (e.g., "shelved"). An alarm type field 308 can indicate that the alarm data structure 300 represents an "over" alarm type, an "under" alarm type, or "out of band" alarm type. An alarm source field 310 can indicate the capabilities of the alarm and can represent "condition monitoring" or "protection" alarm source.

FIGS. 4-9 illustrate an exemplary graphical display space 400 where information related to the operation of a machine (e.g., plot of operational parameter vs. time, visual representations of alarms, alarm properties, and the like) can be displayed. For example, the information can be received by the computing system 206 as described in step 102 of FIG. 1, and displayed on a display (e.g., display 208). The graphical display space 400 can include a plot view 402, an alarm list 404, and machine list 406. In the plot view 402, a plot of the machine operational parameters as a function of time can be displayed. The plot view 402 can include a first axis 440 representative of a time related to the detection time of the operational parameter 444. The first axis 440 can also indicate timing information associated with the operational state of the machine, for example, the time at which the machine enters an operational state, the duration of the operational state, and the time at which the machine exits the operational state. The first axis 440 in FIG. 4 can represent the operation of a machine over a configurable time period, such as over the course of several months (e.g., January to August of 2016), weeks, days, hours, and the like.

The plot view 402 can also include a second axis 442 representative of, for example, the value of the operational parameter 444. In addition to the operational parameter 444, the plot view 402 can include graphical objects 446, 448, 450 that represent various alarms setpoints or triggers (e.g., "over" alarm type, "under" alarm type, "out of band" alarm type, and the like). The alarm setpoints can be triggered by a computing device (e.g., computing device 206) or selected by the computing device from a database of alarms (e.g., selecting an alarm data structure). The alarm properties can be visually represented by the graphical objects, for example, by color, orientation, shape, size, and location of the graphical objects.

Figure 4:
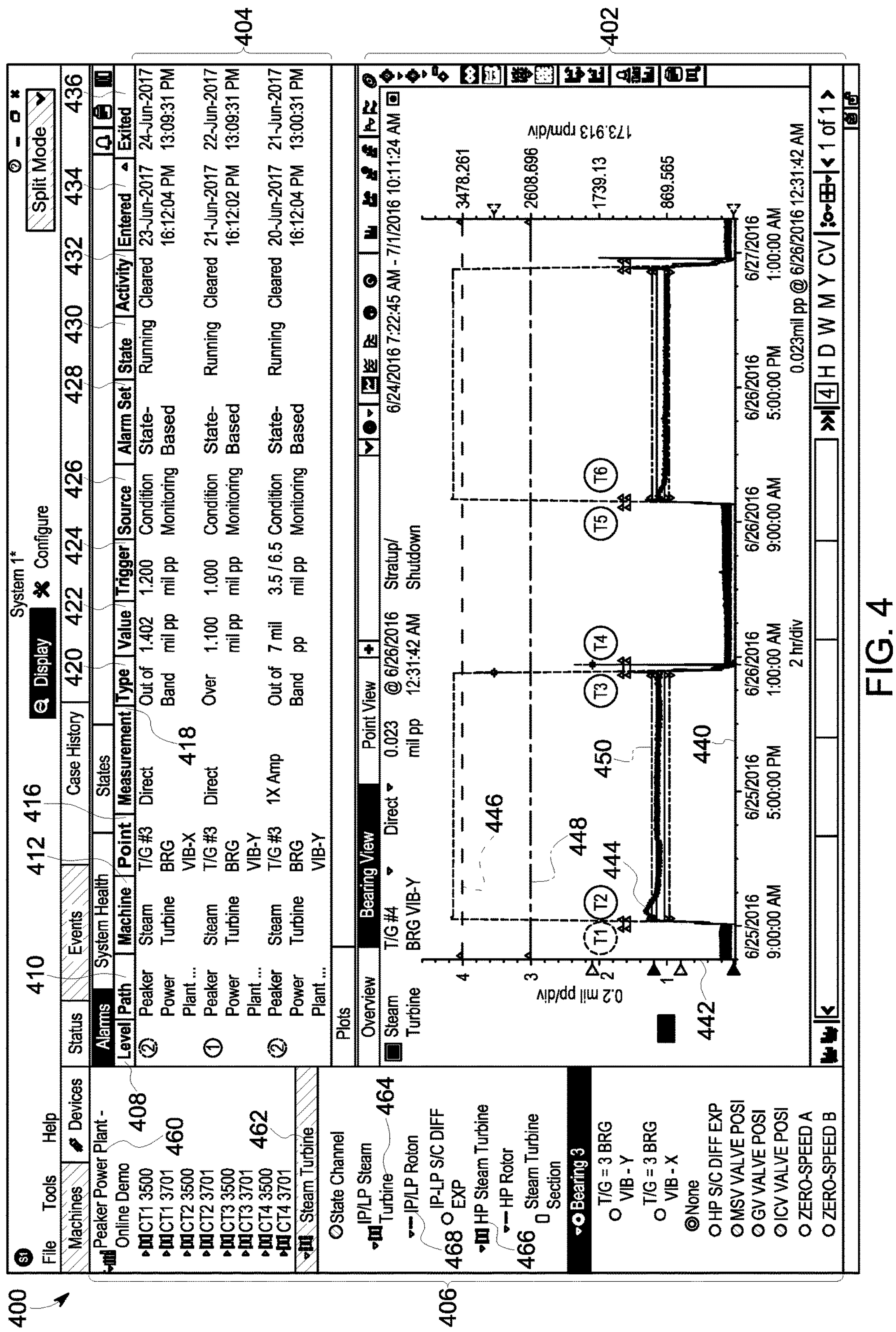
FIG. 4 is a graphical representation illustrating an exemplary graphical display space, which provides alarm information associated with a startup-shutdown state.

The alarm list 404 can provide information related to the various alarms associated with the machine. The alarm list 404 can also provide information related to the various alarm properties. For example, rows of the alarm list 404 can be representative of different alarms and the columns can be representative of the different alarm properties. As shown in FIG. 4, the alarm properties can include alarm level 408, alarm path 410, machine associated with alarm 412, alarm point 416, alarm measurement 418, alarm type 420, alarm value 422, alarm trigger 424, alarm source 426, alarm set 428, alarm operational state 430, alarm activity 432, alarm entry time 434, and alarm exit time 436.

The alarms can include both inactive alarms (e.g., alarms with alarm activity value set to "cleared") and active alarms (e.g., alarms with alarm activity value set to "shelved," "active," and the like). Both active and inactive alarms can also have an acknowledged status. Information of alarms having different alarm activity values can be represented in a visually distinct manner. A visually distinct representation can include, for example, changing the font (e.g., font type, font color, italicizing the font, making the font bold, and the like), changing the background color, and the like. For example, as illustrated in the row 470 of alarm list 404 in FIG. 5, alarm properties of unacknowledged alarms can be displayed in a bold font. Additionally, the alarm level value of an unacknowledged alarm (e.g., active, shelved, and the like) can have a colored background (e.g. a colored circle). Alarm properties of a suppressed alarm can be presented in a row having a predetermined color background. For example, as illustrated in FIG. 6, row 472 of alarm list 404, which presents alarm properties of a suppressed alarm (e.g., alarm activity set to "shelved"), has a shaded/grey color background.

A graphical display space 400 can include a machine list 406 that includes information/identity of the machines associated with the alarm shelving system (e.g., machines that are/have been monitored by the alarm shelving system). The machines can be organized into categories and subcategories that can allow a machine operator to navigate through the machine list 406. Machine information can be organized in a hierarchy (e.g., a tree structure) that has multiple hierarchical levels. For example, as shown in FIG. 4, the machine list 406 illustrates machines of a peaker power plant 460 that can include machines grouped together into machine categories. For example, the peaker power plant (e.g., first hierarchical level 480) can include a category for steam turbine 462 (e.g., second hierarchical level 482). The subcategory for the steam turbine 462 can include the various steam turbines (e.g., third hierarchical level) in the peaker power plant 460 (e.g., IP/LP steam turbine 464, HP steam Turbine 466, and the like). The various steam turbines can include components (e.g., fourth hierarchical level) that can be individually monitored by the monitoring system (e.g., IP/LP Rotor 468). In the aforementioned example, the peak power plant 460, steam turbine 462, IP/LP steam turbine 464, and IP/LP Rotor 468 can constitute a hierarchical chain with four hierarchical levels. The hierarchy can be presented in an indented pattern (e.g., hierarchical levels can be indented with respected to the higher and/or lower hierarchical levels). The machine operator can expand or collapse portions of the hierarchical structure by clicking on the icon representing a hierarchical level. For example, by clicking on the icon representing a hierarchical level (e.g., icon for steam turbine 462), icons of lower hierarchy in the hierarchical chain (e.g., icons of IP/LP steam turbine 464, HP steam turbine 466 along with IP/LP rotor 468 and HP rotor 470) can be collapsed.

The machine list 406 can indicate to a machine operator the machine/machine part under observation by highlighting the icon associated with the machine/machine part in the hierarchical structure. The icon can be highlighted, for example, by presenting the icon in a distinct color, font, and the like. Furthermore, icons representing the higher hierarchical levels with respect to the machine/machine part in the hierarchy chain can also be highlighted. For example, if the HP Rotor is under observation, icons representing HP Rotor 470, HP steam turbine 466, steam turbine 462, and peaker power plant 460 can be highlighted. Additionally, the manner of highlighting the icons can be representative of a property of an alarm associated with the HP Rotor 470. For example, if a level 4 alarm (e.g., represented by red) is associated the HP Rotor 470, the icons for HP steam turbine 466, steam turbine 462, and peaker power plant 460 can be presented with a color representative of a level 4 alarm (e.g., red).

Figure 5:
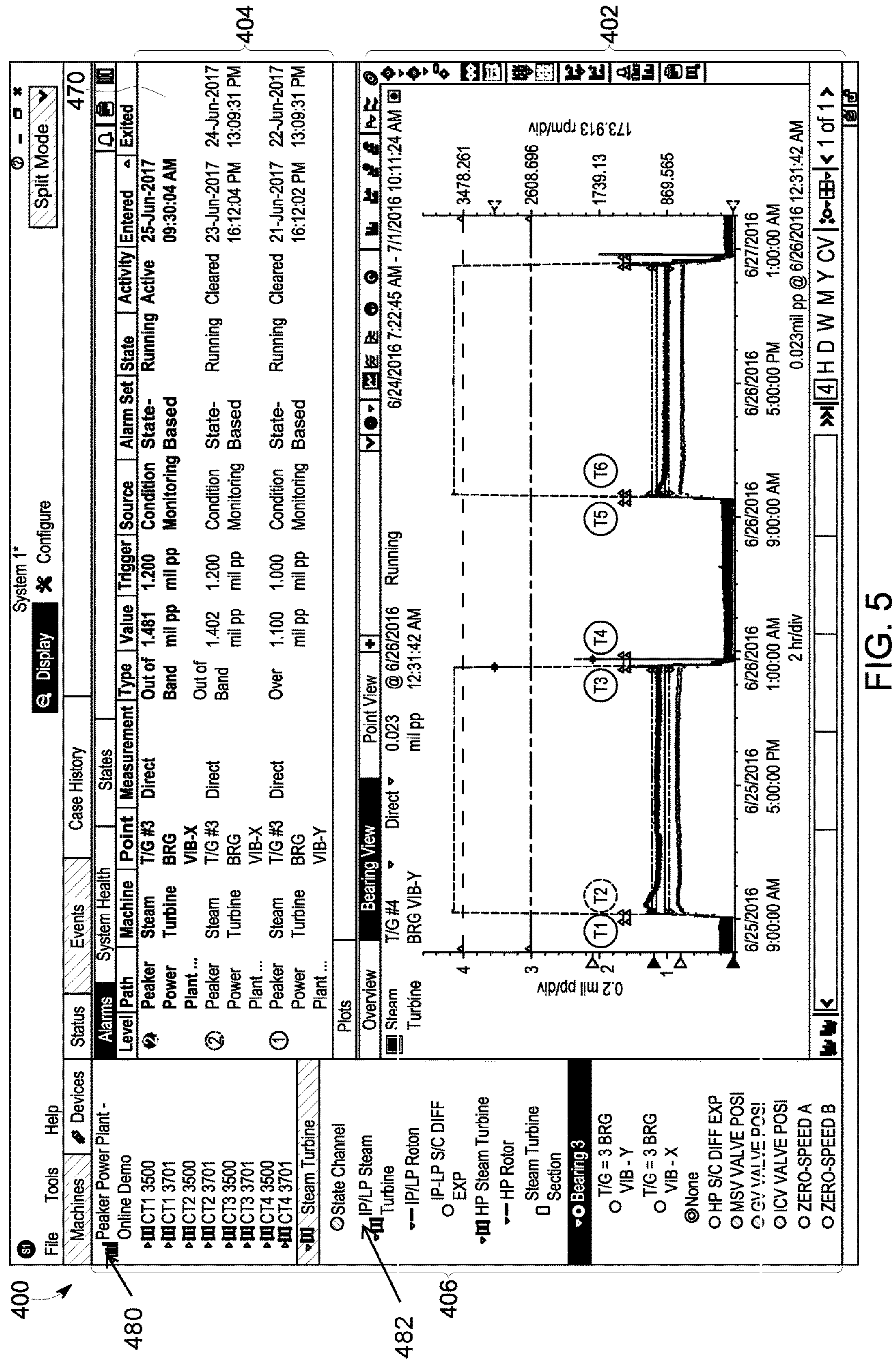
FIG. 5 is a graphical representation illustrating the graphical display space, which provides alarm information associated with transition between the startup-shutdown state and a running state.
Figure 6:
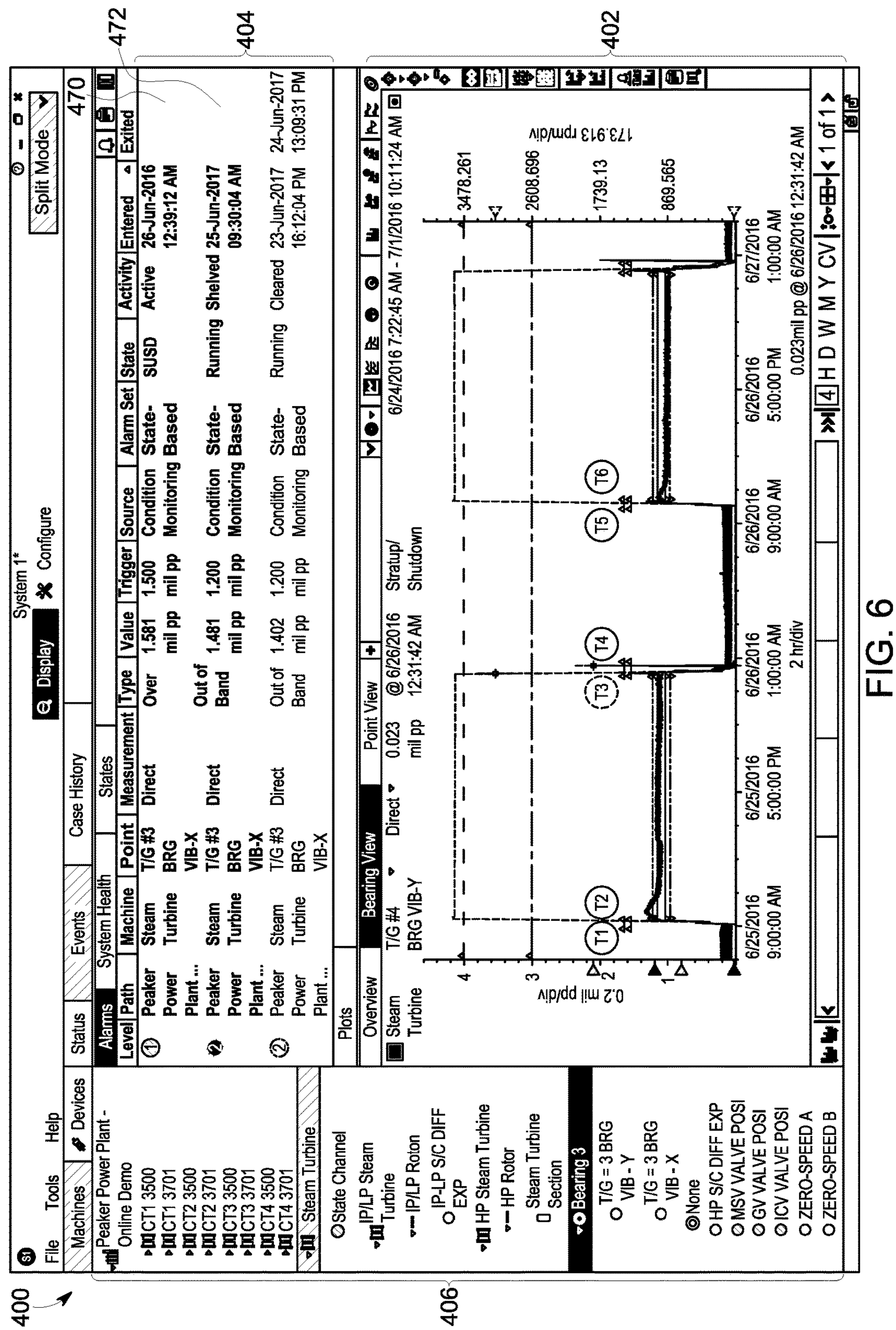
FIG. 6 is a graphical representation illustrating the graphical display space, which provides alarm information associated with transition between the running state and the startup-shutdown state.

FIGS. 4-9 illustrate alarms associated with exemplary operational state transitions of a machine (e.g., machine 202). FIG. 4 illustrates a graphical display space, which provides alarm information associated with a startup-shutdown state (at time T1). In the startup-shutdown state, no alarms are active, shelved, or acknowledged. All the alarms listed in the alarm list 404 have an alarm activity value set to "cleared" indicating that there are no active alarms. At time T2, the machine transitions from the startup-shutdown state to a running state. The graphical display space at time T2 is illustrated in FIG. 5. Because, no alarms were active in the previous state (startup-shutdown state), no alarms have been shelved. Upon entry into the running state, a running alarm (e.g., having an alarm level of 2) can be activated. As shown in FIG. 5, row 470 of alarm list 404 represents the active running alarm. Row 470 can be visually distinct from the other rows of the alarm list 404. For example, the running alarm properties in row 470 are presented in a bold font, and the alarm level value in the alarm level 408 is surrounded by a solid colored circle. These visual characteristics can indicate that the alarm has not been acknowledged and is an active or a shelved alarm.

At time T3, the machine transitions from the running state to the startup-shutdown state. The graphical display space at time T3 is illustrated in FIG. 6. Upon transition to the startup-shutdown state, the running state alarm from the running state is shelved and a startup-shutdown state alarm is activated. As a result there are two unacknowledged alarms: the running state alarm from the previous alarm state, and the startup-shutdown state alarm from the current startup-shutdown state. The unacknowledged alarms are represented in rows 470 (for startup-shutdown state alarm) and 472 (for running state alarm), respectively, and have the visual characteristics of unacknowledged alarms described in discussion of FIG. 6. In some implementations, row 472 can have a shaded/grey background, which can represent that the running alarm of row 472 has been shelved. The different alarm level values can be represented with varying background colors of the alarm level values (in alarm level value column 408).

Figure 7:
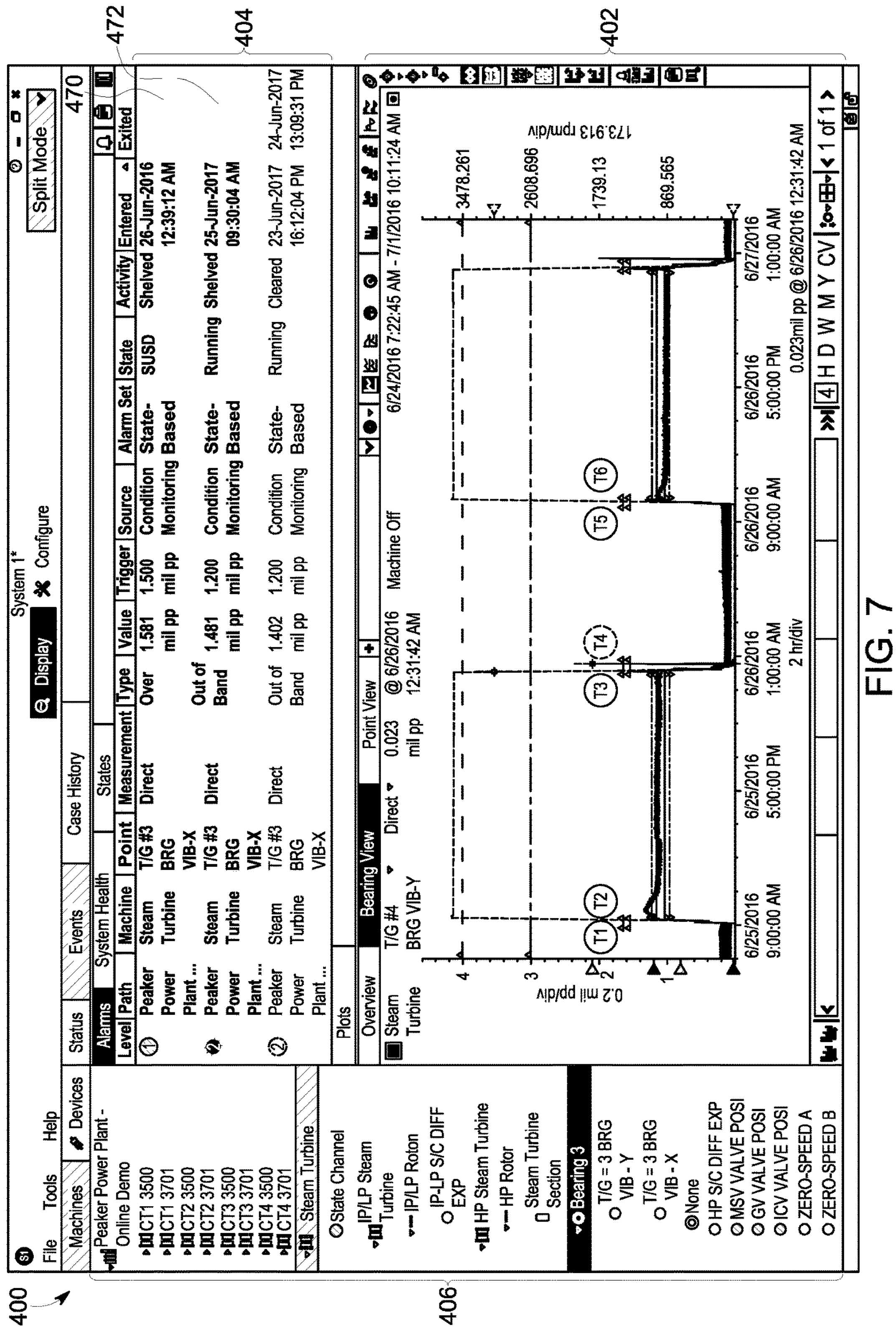
FIG. 7 is a graphical representation illustrating the graphical display space, which provides alarm information associated with transition between the startup-shutdown state and a machine-off state.

At time T4, the machine transitions from the startup-shutdown state to a machine-off state. The graphical display space at time T4 is illustrated in FIG. 7. After this transition the startup-shutdown state alarm from the previous alarm state is shelved. As a result two alarms are shelved: the currently shelved startup-shutdown state alarm and the previously shelved running state alarm. These shelved alarms are presented in rows 470 and 472 of the alarm list 404. Furthermore, no new alarms are activated.

Figure 8:
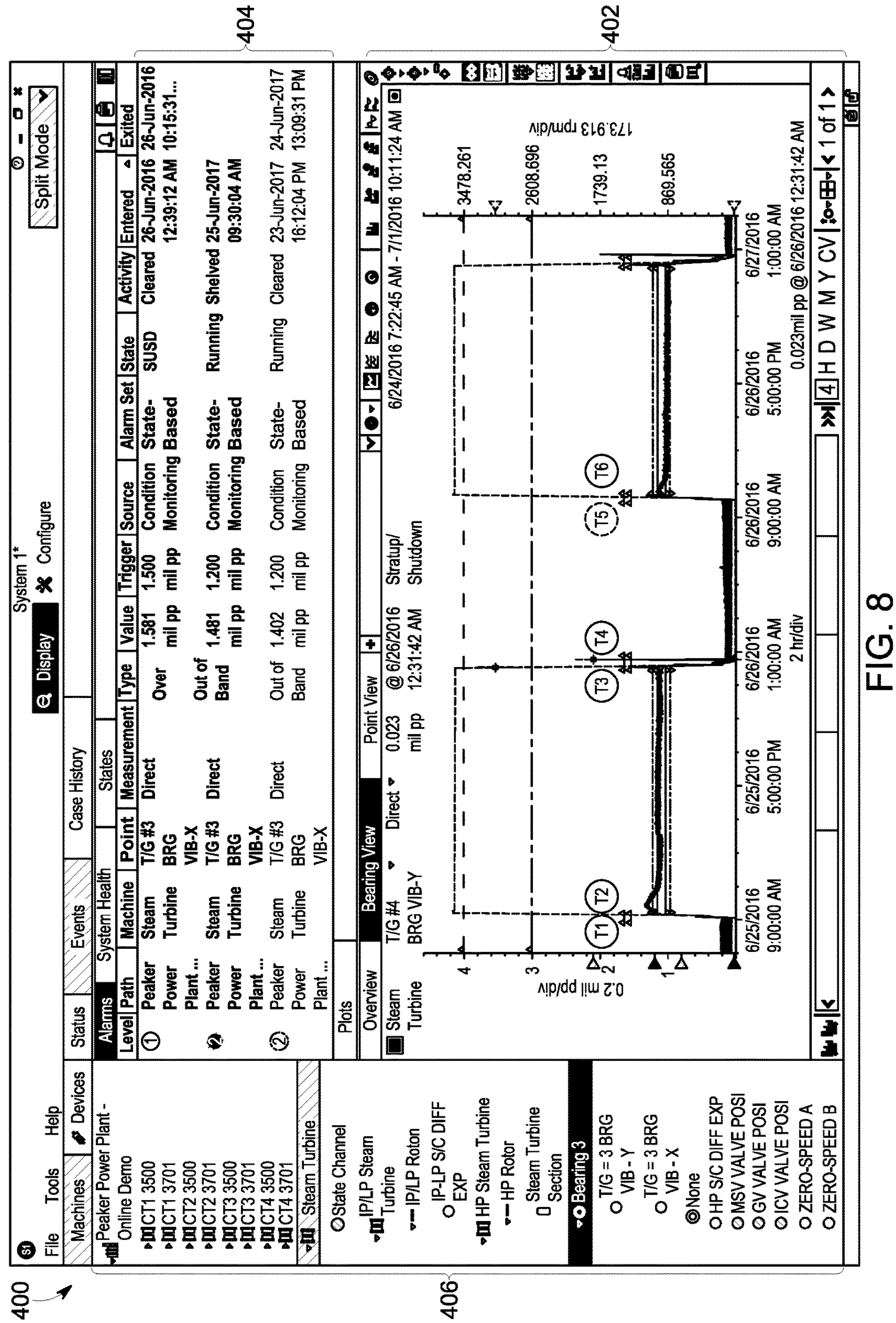
FIG. 8 is a graphical representation illustrating the graphical display space, which provides alarm information associated with transition between the machine-off state and the startup-shutdown state.

At time T5, the machine reenters the startup-shutdown state (upon being started). The graphical display space at time T5 is illustrated in FIG. 8. The startup-shutdown state alarm shelved at time T3 can be activated. However, if the operational parameters of the currently entered startup-shutdown state do not merit a startup-shutdown state alarm, the activated startup-shutdown state alarm can be exited.

Figure 9:
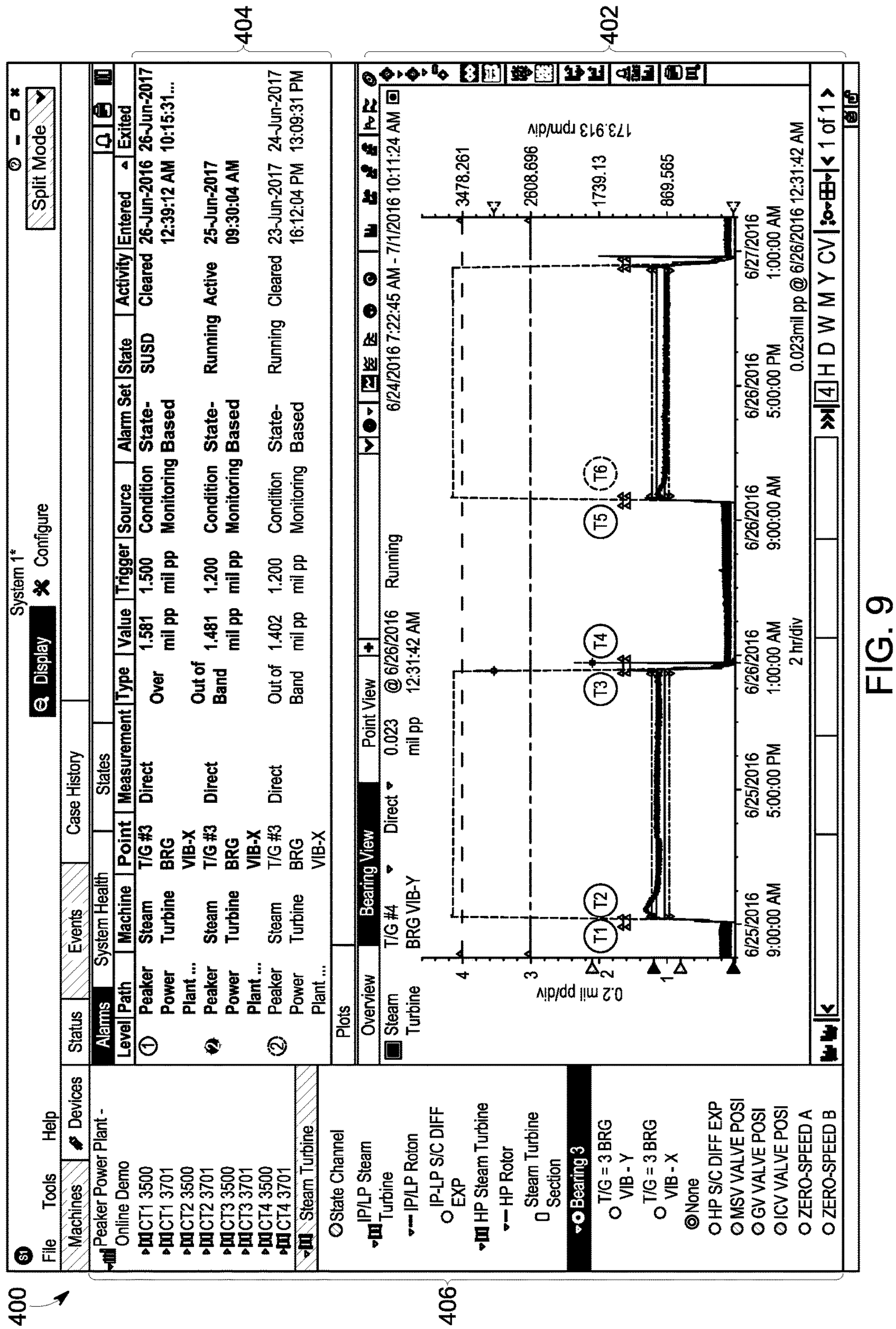
FIG. 9 is a graphical representation illustrating the graphical display space, which provides alarm information associated with transition between the startup-shutdown state and the running state.

Because the startup-shutdown state alarm was not acknowledged before the exit, the current count of unacknowledged alarm is two (same as time T4) and the number of shelved alarm is one (running alarm shelved at T3). At time T6, the machine reenters the running state, and the running alarm shelved at T3 is reactivated. The graphical display space at time T6 is illustrated in FIG. 9. As a result, no alarms are shelved at T6 and two alarms are unacknowledged (same at time T5).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:

receiving data characterizing a state-transition of a machine from a first operational state to a second operational state, wherein the data characterizing the state-transition of the machine includes operational parameter values of the machine in the first operational state and second operational state, and timing information associated with the first operational and second operational state;

setting a first field of a first data structure representing a first alarm of the first operational state to a shelved value representative of suppression of the first alarm; and setting a second field of a second data structure representing a second alarm of the second operational state to an activity value determined based on the received data characterizing the transition and a previous alarm associated with the second operational state, wherein determining the activity value includes retrieving information related to the previous alarm associated with the second operational state, and evaluating the activity value based on received operating parameter values of the second operational state.

2. The method in claim 1, further comprising displaying a first graphical object representing the first alarm in a graphical display space including a first axis representative of the timing information, the graphical display space includes a second axis for displaying a plot over time of the operational parameter values of the machine, an extent of the first graphical object limited to time values of the timing information associated with the first operational state.

3. The method in claim 1, further comprising setting a third field of a third data structure representing a third alarm of the first operational state to a shelved value representative of suppression of the third alarm.

4. The method in claim 1, wherein data characterizing the first operational state is presented in a first row of a table having a first visual characteristic and data characterizing the second operational state is presented in a second row of the table having a second visual characteristic, the first visual characteristic different from the second visual characteristic.

5. The method in claim 1, wherein the first operation state and the second operational state is one of startup-shutdown state, running state and machine-off state.

6. The method in claim 1, further comprising:

receiving an input indicative of acknowledgment of the first alarm and setting the first field of the first data structure to a cleared value representative of suspension of the first alarm.

7. The method in claim 1, further comprising displaying a hierarchical structure in a graphical display space, the hierarchical structure includes a first hierarchical level visually presented by a first icon and a second hierarchical level visually presented by a second icon, the first hierarchical level representative of a machine unit that includes the machine, and the second hierarchical level representative of the machine, wherein the state transition of the machine is represented by altering a visual characteristic of the first icon and the second icon.

8. A non-transitory computer program product storing instructions, which when executed by at least one data processor of at least one computing system, implements a method comprising:

receiving data characterizing a state-transition of a machine from a first operational state to a second operational state, wherein the data characterizing the state-transition of the machine includes operational parameter values of the machine in the first operational state and second operational state, and timing information associated with the first operational and second operational state;

setting a first field of a first data structure representing a first alarm of the first operational state to a shelved value representative of suppression of the first alarm; and setting a second field of a second data structure representing a second alarm of the second operational state to an activity value determined based on the received data characterizing the transition and a previous alarm associated with the second operational state, wherein determining the activity value includes retrieving information related to the previous alarm associated with the second operational state, and evaluating the activity value based on received operating parameter values of the second operational state.

9. The computer program product of claim 8, further comprising displaying a first graphical object representing the first alarm in a graphical display space including a first axis representative of the timing information, the graphical display space includes a second axis for displaying a plot over time of the operational parameter values of the machine, an extent of the first graphical object limited to timing values of the time information associated with the first operational state.

10. The computer program product of claim 8, wherein data characterizing the first operational state is presented in a first row of a table having a first visual characteristic and data characterizing the second operational state is presented in a second row of the table having a second visual characteristic, the first visual characteristic different from the second visual characteristic.

11. The computer program product of claim 8, further comprising displaying a hierarchical structure in a graphical display space, the hierarchical structure includes a first hierarchical level visually presented by a first icon and a second hierarchical level visually presented by a second icon, the first hierarchical level representative of a machine unit that includes the machine, and the second hierarchical level representative of the machine, wherein the state transition of the machine is represented by altering a visual characteristic of the first icon and the second icon.

12. A system comprising:

at least one data processor;

memory storing instructions which, when executed by the at least one data processor, causes the at least one data processor to perform operations comprising:

receiving data characterizing a state-transition of a machine from a first operational state to a second operational state, wherein the data characterizing the state-transition of the machine includes operational parameter values of the machine in the first operational state and second operational state, and timing information associated with the first operational and second operational state;

setting a first field of a first data structure representing a first alarm of the first operational state to a shelved value representative of suppression of the first alarm; and setting a second field of a second data structure representing a second alarm of the second operational state to an activity value determined based on the received data characterizing the transition and a previous alarm associated with the second operational state, wherein determining the activity value includes retrieving information related to the previous alarm associated with the second operational state, and evaluating the activity value based on received operating parameter values of the second operational state.

13. The system of claim 12, further comprising displaying a first graphical object representing the first alarm in a graphical display space including a first axis representative of the timing information, the graphical display space includes a second axis for displaying a plot over time of the operational parameter values of the machine, an extent of the first graphical object limited to time values of the timing information associated with the first operational state.

14. The system of claim 12, wherein data characterizing the first operational state is presented in a first row of a table having a first visual characteristic and data characterizing the second operational state is presented in a second row of the table having a second visual characteristic, the first visual characteristic different from the second visual characteristic.

* * * * *